United States Patent [19]
Dola

[11] Patent Number: 4,616,897
[45] Date of Patent: * Oct. 14, 1986

[54] NETWORK INTERFACE DEVICE

[75] Inventor: Frank P. Dola, Hudson, Fla.

[73] Assignee: AMP Incorporated, Harrisburg, Pa.

[*] Notice: The portion of the term of this patent subsequent to Feb. 19, 2002 has been disclaimed.

[21] Appl. No.: 681,400

[22] Filed: Dec. 13, 1984

Related U.S. Application Data

[63] Continuation-in-part of Ser. No. 499,659, May 31, 1983, Pat. No. 4,500,158.

[51] Int. Cl.$^4$ .......................................... H01R 13/514
[52] U.S. Cl. .............................. 339/122 R; 339/176 M
[58] Field of Search ................. 339/122 R, 123, 125, 339/126, 17 L, 17 LC, 91 R, 176 M, 176 MP, 122 F, 191 R; 179/91 R, 98

[56] References Cited

U.S. PATENT DOCUMENTS

| | | | |
|---|---|---|---|
| 4,146,292 | 3/1979 | Garrett | 339/125 R |
| 4,220,391 | 9/1980 | Krolak et al. | 339/126 R |
| 4,237,342 | 12/1980 | Eller et al. | 179/91 R |
| 4,269,463 | 5/1981 | Beatenbough | 339/91 R |
| 4,273,957 | 6/1981 | Kolling, Jr. | 179/98 |
| 4,290,664 | 9/1981 | Davis et al. | 339/125 R |
| 4,343,527 | 8/1982 | Harrington et al. | 339/125 R |
| 4,407,559 | 10/1983 | Meyer | 339/126 R |
| 4,500,158 | 2/1985 | Dola | 339/176 M |

Primary Examiner—Gil Weidenfeld
Assistant Examiner—Thomas M. Kline
Attorney, Agent, or Firm—Russell J. Egan; Robert W. Pitts

[57] ABSTRACT

Electrical connector for telephone wiring interface providing lightning protection is formed by dielectric base having first terminals thereon for terminating wires and having upright first members aligned with apertures in a dielectric cover latched to base and a stanchion normal received in a dielectric jack mounted to the base to provide testing by inserting a plug inserted through an aperture in the cover. A plug member has second terminals fixed thereon for receiving wires and upright second mating members arranged to mate with first mating members in apertures. Base and cover accommodate a lightning arrester and include a removable insert to compensate for arresters of different sizes.

9 Claims, 4 Drawing Figures

NETWORK INTERFACE DEVICE

The present invention is a continuation-in-part of U.S. Pat. No. 4,500,158, Ser. No. 499,659, filed May 31, 1983.

The present invention relates to a releasable connector for connecting two groups of wires, particularly telephone wires, and more particularly to a connector which can accept anyone of a number of known lightning arrester safety devices.

Recent deregulation of the telephone companies requires that all premises wiring be customer owned and that the serving telephone company provide a network interface device separating the company's wiring from the customer's wiring. The Electronic Industries Association recommends that a device be provided for connecting single-line service, and that two-line service should be provided at the network interface as two single-line services. The device should be foolproof and is intended to provide a means for isolating troubles between terminal equipment, premises wiring, and public network facilities. The device should provide a standard RJ11 jack for testing purposes, and should be weatherproof for outside mounting. Further, the device should be capable of including any standard lightning arrester safety device therein.

The network interface device of the present invention meets the design criteria by providing stamped and formed terminals having wire termination means, mating means to engage an associate terminal, and a spring contact for a phone jack formed integrally with each terminal. Four such terminals mounted to a base are arranged to mate with four similar terminals sans spring contacts on a plug member; the spring contacts are contained in a jack so that a customer may remove the plug member and use the jack to determine whether repair of a malfunction is the responsibility of the phone company or himself. The base is also provided with a profiled lightning arrester receiving area having a removable insert so as to accommodate arresters of different sizes. A cover fixed to the base has apertures for mating terminals and access to the test jack which is not readily removed, thus precluding the customer from tampering with phone company terminations or components therein. The assembly is protected from weather by channels between the plug member and cover which break surface tension of water, obviating the need for a conventional discrete seal. The cover and plug are provided with security means to prevent tampering. Phone company wires enter the cover through a grommet in the bottom sidewall thereof while premises wires enter the plug member through a grommet in the bottom sidewall thereof.

Figure 1:
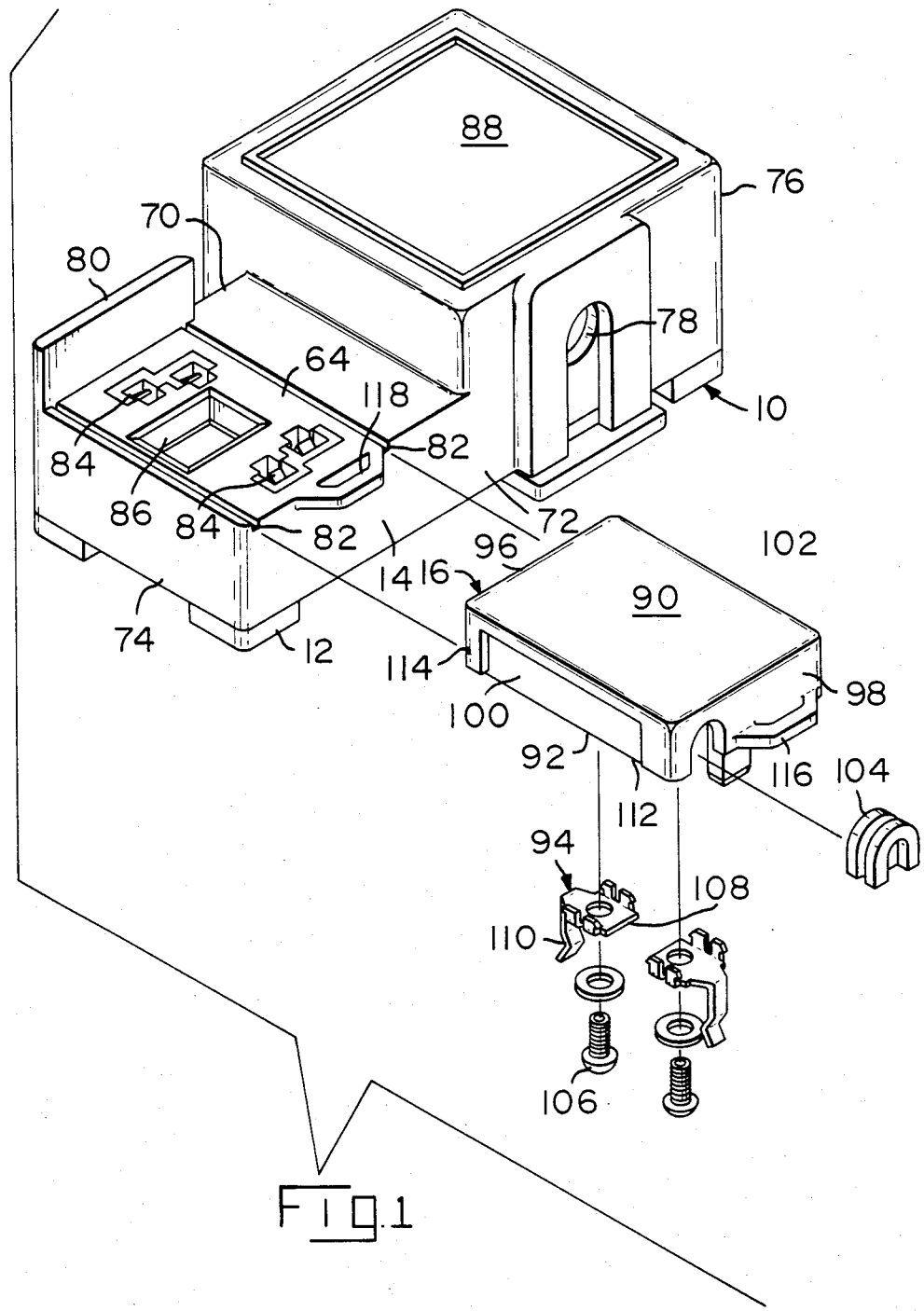
FIG. 1 is a perspective of the subject device with the plug member exploded therefrom.

FIG. 1 is a perspective of the subject network interface device 10 comprising a base 12, cover 14, and plug member 16 with other components assembled thereto. The base 12 (see FIG. 2) is of molded plastic and comprises a first surface 18, an opposed second surface 20, top and bottom sides 22, 24 respectively, and left and right ends 26, 28 respectively. Legs 30 at the corners and other points of base 12 have holes 32 which permit mounting to a flat vertical surface such as a wall (not shown) with the bottom surface 20 of base 12 spaced from the wall. The top surface 18 has a lightning arrester 34 mounted therein with terminal posts 36 therein which are ultimately wired in series with incoming lines (not shown) subject to lightning strike. A large enough power surge causes short circuiting through contact 38 to post 40, which is grounded. First terminals 42 are fixed to top surface 18 and have screws (not shown) through intermediate portions 44 for terminating incoming phone company wires. Each first terminal 42 has a first mating member 46 and a spring contact 48; the spring contacts 48 of the four first terminals 42 are received in a jack 50 having latch legs 52 which are received in mounting holes 54 in base 12 and latched on ledges 56 of first terminals 42. The jack 50 is mounted against intermediate portions 44 of terminals 42 and a pad 58 molded on the first surface 18 of base 12. The base also has integral molded shaped legs 60, 62 extending normal to surface 18 and defining partial first terminal enclosures.

The cover 14 is molded of plastic and has a first surface 64, a cavity 68, opposed top and bottom sidewalls 70, 72 respectively, and opposed left and right endwalls 74, 76. The bottom sidewall 72 contains an entry port 78 where phone company wires (not shown) enter through grommet 79 in base insert 120 for termination to terminals 36. The top wall 70 has an overhang 80 coplanar therewith which extends beyond first surface 64 and shields the interface between plug member 16 and cover 14. Channels 82 in first surface 64 aid in breaking surface tension to prevent ingress of water between the cover and plug. Apertures 84 receive first mating members 46 and shaped legs 60, 62 while aperture 86 receives jack 50. The cover 14 is held to base 12 by latches (not shown). Top surface 18 defines a large cavity which encloses the lightning arrester 34. The base 12 includes a recess 130 for receiving insert 120.

The plug member 16 has a first surface 90 and a second surface 92 to which second terminals 94 are fixed. The second surface is flanked by top and bottom sidewalls 96, 98 respectively, and left and right endwalls 100, 102 respectively. The premises wiring (not shown) enters the plug member 16 through grommet 104 in bottom wall 98 and attaches to screws 106 in intermediate portions 108 of the second terminals 94. Each terminal 94 has a second mating member 110 extending substantially normally to second surface 92. Each member 110 is received in a leg member 60, 62 molded into the base 12. Ribs 112 on the edges of endwalls 100, 102 are slightly narrower and lower than channels 82 in which they are received. Channel 114 in top wall 96 breaks surface tension to prevent ingress of water, and in cooperation with ribs 112 and channels 82 precludes the necessity of providing a discrete seal between the plug member 16 and cover 14.

The plug member 16 and cover 14 are each provided with an integral security ring 116, 118, respectively, which can receive a tie or seal (not shown) to prevent tampering and/or vandalism by unplugging telephone service.

Figure 2:
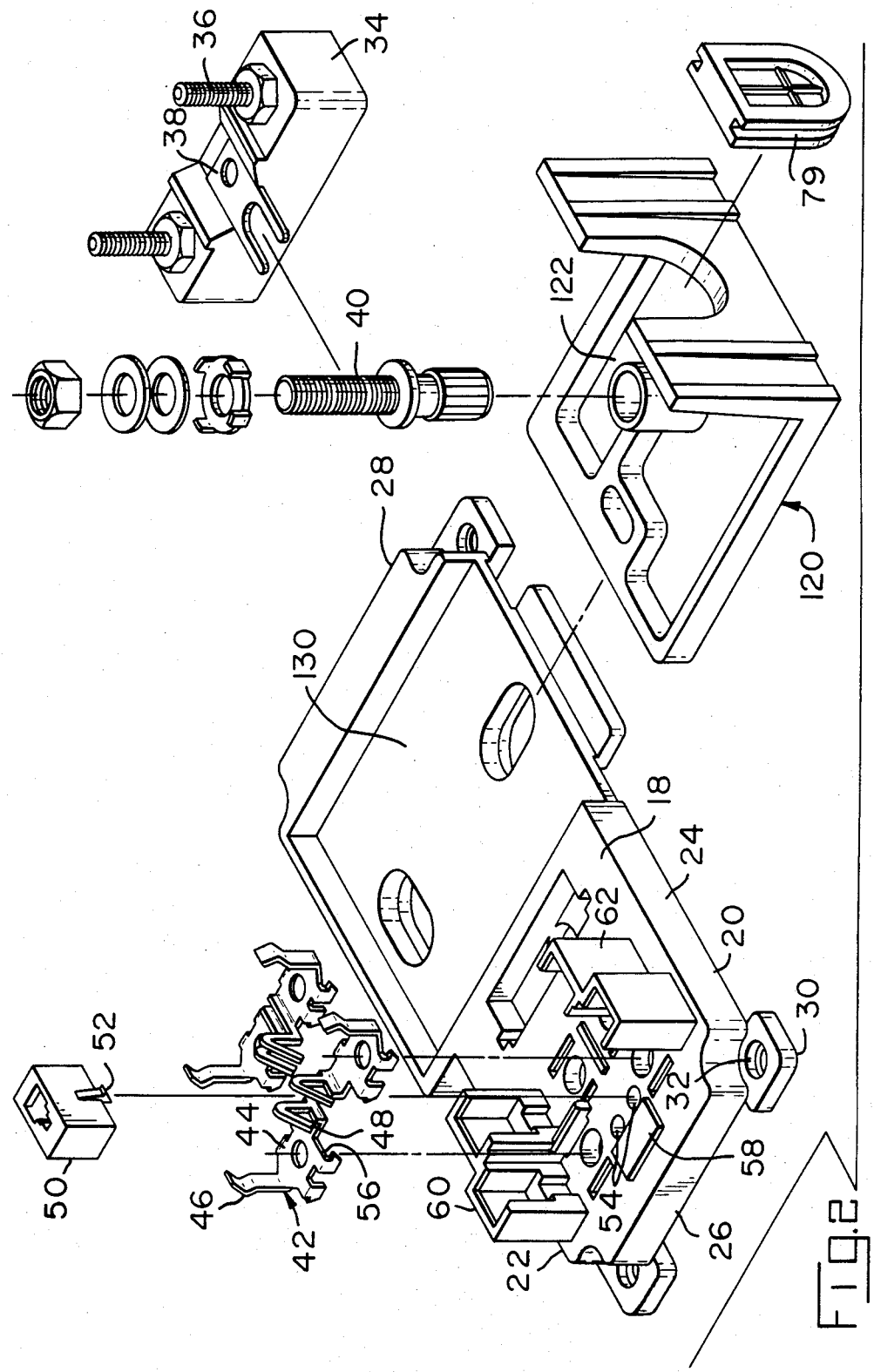
FIG. 2 is an exploded perspective of the base portion of the subject device.

FIG 2 is a perspective of the base 12 with removable insert 120 exploded in the common horizontal plane in which they engage. The insert 120 is profiled to have a base similar to that of standard lightning arresters. The commonly used lightning arrester is the Cook Electric LCGX generic type "500" arrester described in U.S. Pat. No. 3,310,712, the disclosure of which is incorporated herein by reference. Other known lightning arresters are the CP-508 manufactured by Sylvania and the TII Industries 355M, which is half the width of the Cook and Sylvania arresters. The insert 120 would be removed for either the Cook Electric or Sylvania devices and added to receive the TII Industries device in recess 122 as shown in FIG. 2.

Figure 3:
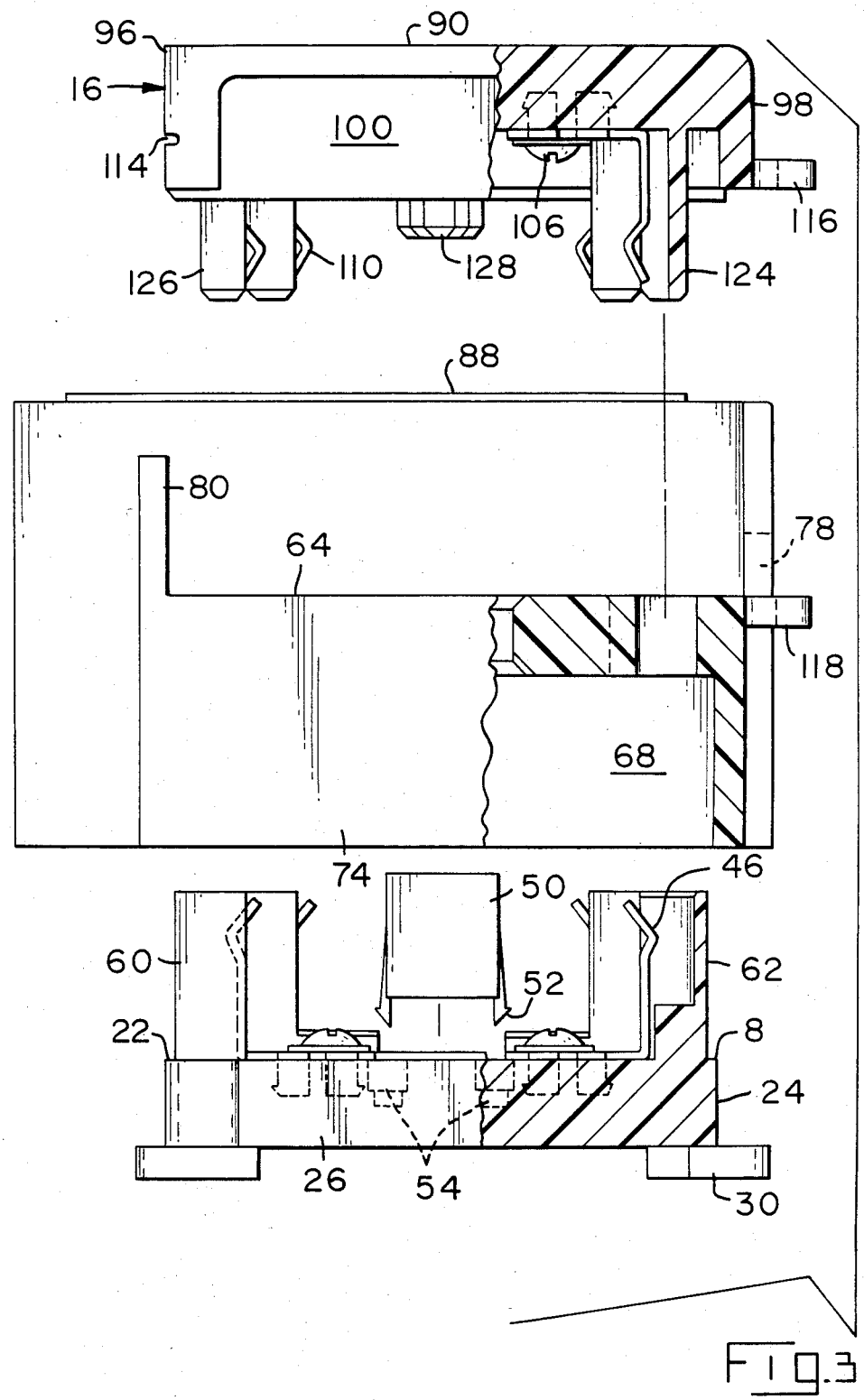
FIG. 3 is an exploded end elevation partly in section, of the subject device.
Figure 4:
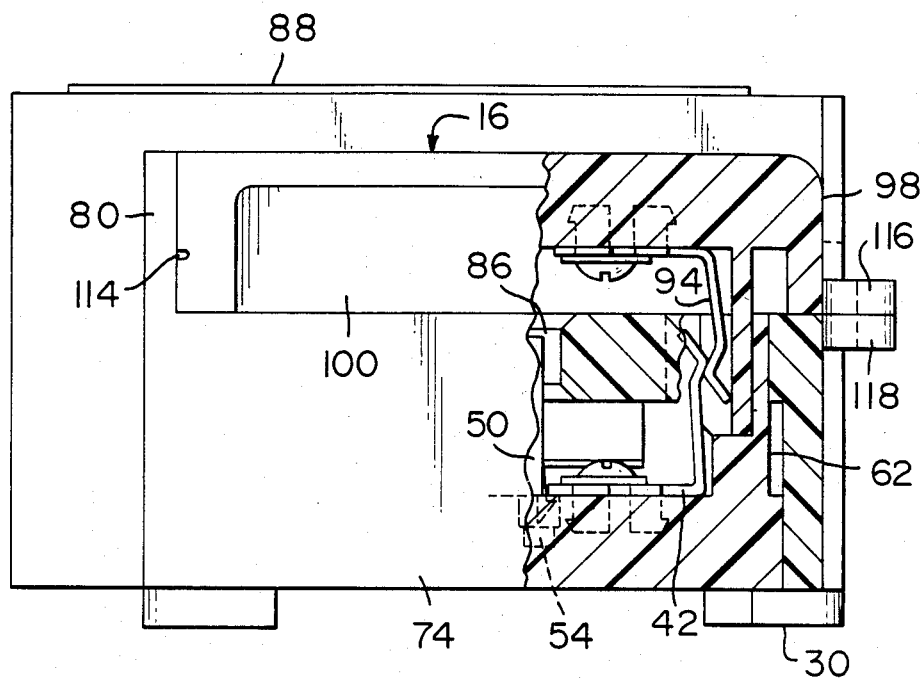
FIG. 4 is an end elevation, partly in section of the assembled device.

FIGS. 3 and 4 are partial section views of the subject device. FIG. 3 shows the components exploded apart and FIG. 4 shows the components fully assembled. Second surface 20 of base 12 sits on legs 30 which provide offset from a wall to which the base 12 mounts. The opposed first surface 18 has slots therein which provide an interference fit for latching legs on first terminals 42. Holes 54 receive screws (not shown) which terminate phone company wires, but do not serve to retain the terminals to base 12. Jack 50 is fitted to base 12 with legs 52 received in holes 58 in first surface 18. The legs 52 are latched under ledges 56 on first terminals 42, which are previously fixed to base 12. Thus the jack 50 is positioned to the same tolerance as the terminals 42 are fixed to the base 12. Cover 14 is fitted over base 12 against feet 30 so that latches (not shown) in top and bottom walls engage. Aperture 86 receives jack 50 while apertures 84 receive mating members 42 to a height just below first surface 64. The second terminals 94 are protected on three sides by legs 124, 126, which further aid in aligning plug member 16 to cover 14 by a close fit in the apertures 84, which in turn assures proper alignment of second terminals 94 with terminals 42. The legs 124, 126 also prevent damage to the terminals 92 while applying the premises wires. As the plug member 16 is moved toward the cover 14, respective engaging sections meet and slide across each other as spring arms 46 flex inward and spring arms 110 flex outward until bends therein are adjacent. Thereafter the spring arms urge the plug member 16 and cover 14 together as respective bearing sections slide across each other. Blank plug 128 extending from the second surface of plug member 16 is received in jack 50 and prevents entry of foreign matter or insects which could cause short-circuiting of the contacts. The overhang 80 fits against top side 96 of plug 16 to protect the interface from rain impingement. Channel 114 acts as a seal by breaking surface tension of any water creeping in.

Connection of the plug member 16 to the cover 14 and base 12 as described above serves to connect premises wiring terminated to terminals in the plug member 16 to phone company wiring terminated to terminals on the base member 12. Should a subscriber's service be interrupted, the source of the problem may be checked by removing the plug member 16 and plugging a telephone plug (not shown) into the jack 50.

The foregoing description is exemplary and not intended to limit the scope of the claims which follow.

I claim:

1. A network interface device for terminating network telephone wiring at a subscriber's premises and for connecting the subscriber's wiring to the network, which device comprises:

a base having a first surface, means for mounting said base to a fixed surface, said base carrying on said first surface a telephone jack having a plurality of spring contacts therein and a like plurality of first terminals for connecting to said network telephone wiring, said spring contacts being electrically connected to like ones of said first terminals, a lightning arrester recess, and a removable insert;

a cover having a first surface, an opposed second surface, and means for mounting said cover to said base so that said second surface of said cover faces said first surface of said base, said cover having a plurality of apertures therethrough between said first and second surface thereof which provide access to said first terminals and said jack, said cover defining a cavity over said lightning arrester recess; and a plug member having a first surface, an opposed second surface, and means for mounting said plug member to said cover so that said second surface of said plug member faces said first surface of said cover, said plug member carrying on said second surface a plurality of second terminals for connecting to said subscriber's wiring and arranged for mating to said first terminals through said apertures when said cover is mounted to said base and said plug member is mounted to said cover, said recess being profiled to receive a first large lightning arrester when said insert is removed, and said recess being profiled to receive said insert, said insert being profiled to receive a second smaller lightning arrester.

2. A network interface device according to claim 1 further comprising:
   a grounding post secured in said insert to be engaged by the smaller of said lightning arresters.

3. A network interface device according to claim 1 further comprising:
   an internal ring on each of said cover and said plug members aligned to receive a security member jointly therethrough whereby unauthorized removal of said plug member is deterred.

4. A network interface device according to claim 1 further comprising:
   an integral flange extending from said cover to closely overlie an upper end of said plug member, and
   a groove in said upper end of said plug member whereby surface tension between said flange and said plug member is broken to prevent ingress of moisture between said cover and said plug member obviating need for conventional sealing means.

5. The device of claim 1 wherein the recess comprises a floor, sidewalls and at least one endwall.

6. The device of claim 5 wherein the floor of said recess is parallel to the first said surface of the base.

7. The device of claim 1 wherein the insert comprises a base section having an upstanding wall thereof.

8. The device of claim 7 wherein the upstanding wall of the insert further includes a wire receiving entry.

9. The device of claim 8 wherein the cover over the lightning arrester includes a wire receiving entry aligned with said wire receiving entry in said insert.

* * * * *